(12) United States Patent
Lin

(10) Patent No.: US 7,073,554 B1
(45) Date of Patent: Jul. 11, 2006

(54) INTEGRATION DEVICE FOR COMPACT DISK

(75) Inventor: Chih-Ming Lin, Taipei Hsien (TW)

(73) Assignee: Guann Way Technologies Co., Ltd., Taipei Hsien (TW)

( * ) Notice: Subject to any disclaimer, the term of this patent is extended or adjusted under 35 U.S.C. 154(b) by 0 days.

(21) Appl. No.: 11/133,392

(22) Filed: May 20, 2005

(51) Int. Cl.
*B32B 37/10* (2006.01)

(52) U.S. Cl. ............... 156/581; 156/539; 156/556; 156/580

(58) Field of Classification Search ............... 156/74, 156/285, 286, 382, 538, 539, 556, 557, 566, 156/578, 580, 581, 583.1
See application file for complete search history.

(56) References Cited

U.S. PATENT DOCUMENTS

| | | | |
|---|---|---|---|
| 5,240,548 A * | 8/1993 | Aramaki et al. ............ 156/556 |
| 5,743,965 A * | 4/1998 | Nishimura et al. ......... 118/712 |
| 5,938,891 A * | 8/1999 | Kashiwagi et al. ......... 156/578 |
| 6,224,702 B1 * | 5/2001 | Kitano et al. ................. 156/74 |
| 2003/0070765 A1 * | 4/2003 | Eichlseder .................. 156/580 |
| 2003/0104097 A1 * | 6/2003 | Matsumoto et al. ........ 425/500 |
| 2004/0177930 A1 * | 9/2004 | Chu ........................... 156/538 |

* cited by examiner

*Primary Examiner*—James Sells
(74) *Attorney, Agent, or Firm*—Bacon & Thomas

(57) ABSTRACT

An integration device for a compact disk has a reversing element and an elevator. The reversing element has a first engine, an arm and a first seat, whereby the arm is rotated reversely in turn. The elevator has a second seat, a base, a second suction disk and a second engine. A shaft mounted in a center of the second suction disk and inserted into the hole, whereby the second suction disk is driven to rotate or lift. Hence, the first base is raised exactly facing the second base so that the first base can be directly adjacent to the second base face to face thereby avoiding generating bubbles to enable glue to distribute evenly and result in the compact disk with an even thickness.

3 Claims, 6 Drawing Sheets

US 7,073,554 B1

INTEGRATION DEVICE FOR COMPACT DISK

BACKGROUND OF THE INVENTION

1. Field of the Invention

The present invention relates to an integration device for a compact disk, and more particularly to an integration device which can combine two disk bases of the compact disk.

2. Description of Related Art

At present, compact disks, known as a kind of recording medium that uses a laser, have become immensely popular in many different ways. The compact disk is composed of a first transparent disk base, and a second disk base with a record layer. With the integration device for the compact disk, the first and the second bases can be combined to each other, thereby completing the manufacture procedure of the compact disk.

A conventional integration device for a compact disk comprises two rotating elements and two disk elements. A first and a second base are respectively taken to be provided on the disk elements by the rotating elements. After two rings of glue are respectively coated on each side of the first and the second base, the first base is superposed on the second base due to the glue being sandwiched between the first and the second base. The first base is slowly combined with the second base to enable the ring of the glue to evenly distribute between the bases. Then, the compact disk is rotated by one of the rotating elements, and therefore, the glue can be spread between the bases.

However, the first base is attached to the second base with rotation from an inclined angle to a horizontal angle, such that bubbles generate between the first and second base, and thereby resulting in an uneven thickness of the compact disk and this reduces the quality of the compact disk. To decrease the generation of the bubbles, the rotation of the compact disk is done several times but then an efficiency of the manufacture procedure is reduced.

Therefore, the invention provides an integration device for a compact disk to mitigate or obviate the aforementioned problems.

SUMMARY OF THE INVENTION

The main objective of the present invention is to provide an integration device for a compact disk which can reduce the generation of the bubbles between two bases of the compact disk during manufacture.

Other objectives, advantages and novel features of the invention will become more apparent from the following detailed description when taken in conjunction with the accompanying drawings.

DETAILED DESCRIPTION OF THE PREFERRED EMBODIMENT

An integration device for a compact disk in accordance with the present invention is provided in a cohesion machine which can automatically combine the compact disks. The cohesion machine comprises an integration device, a rotation disk element, a glue element, a collect-compact-disk element, etc.

Figure 1:
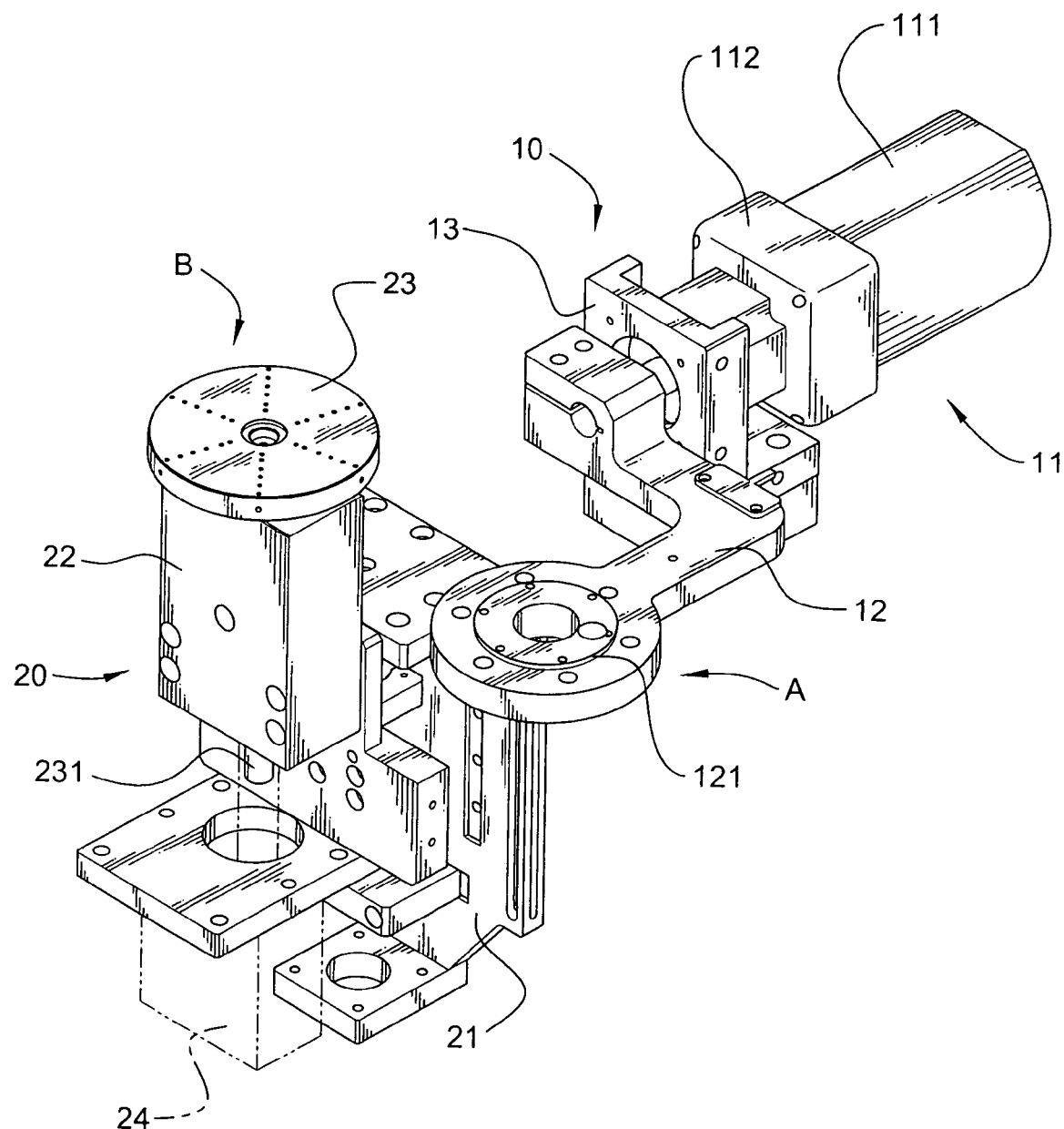
FIG. 1 is a perspective view of an integration device for a compact disk in accordance with the present invention.
Figure 2:
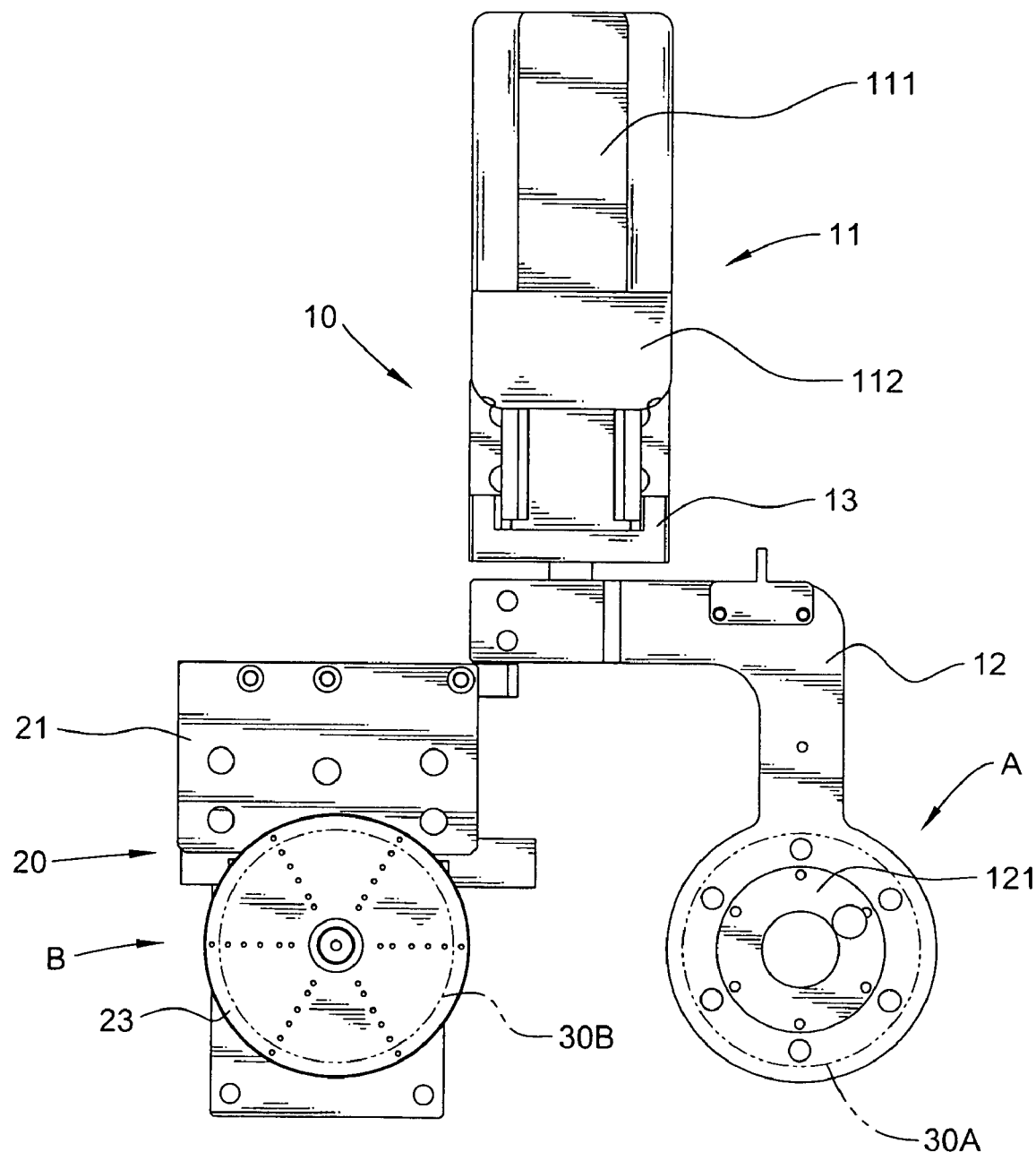
FIG. 2 is a top view of the integration device for a compact disk in accordance with the present invention.
Figure 3:
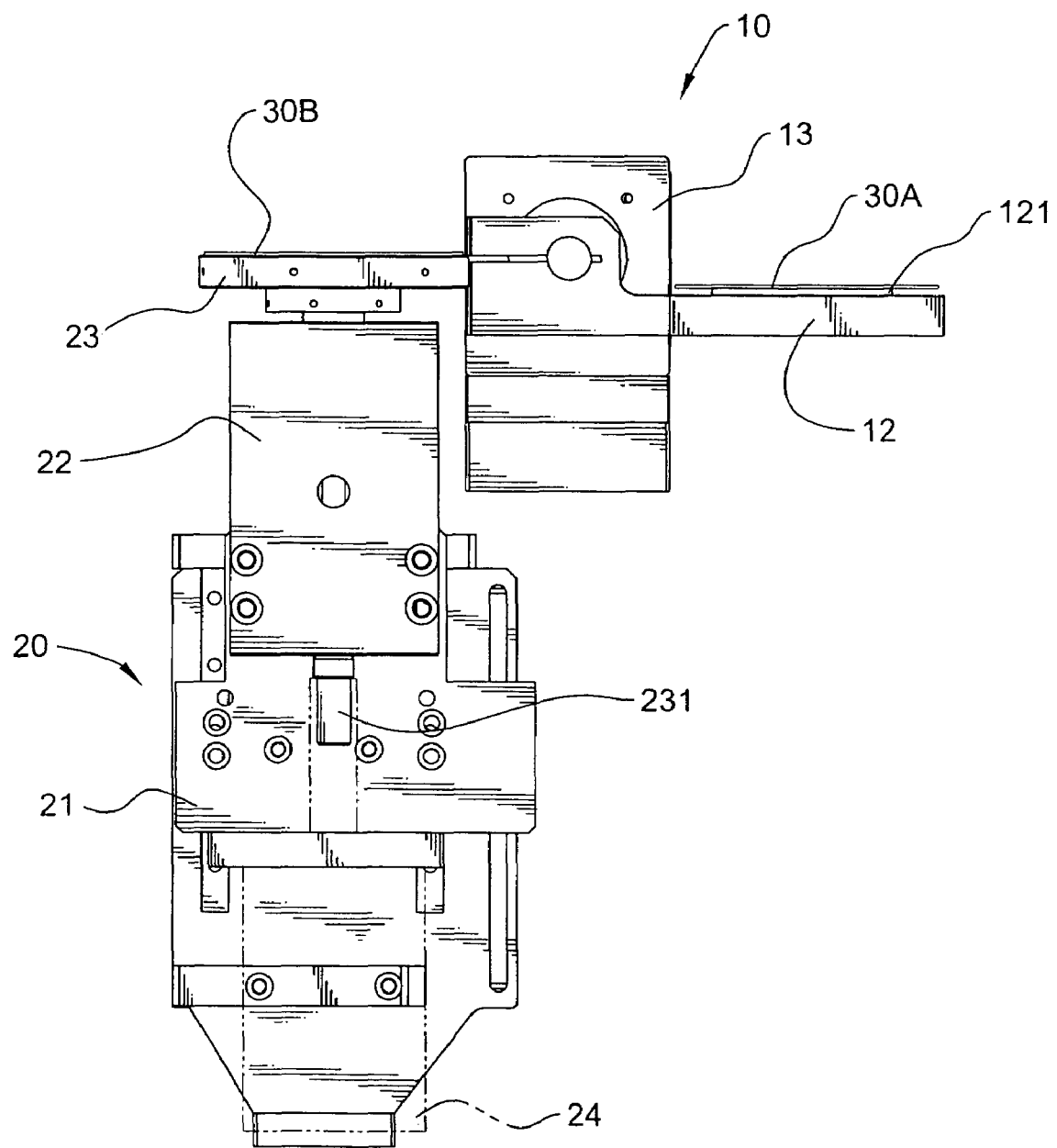
FIG. 3 is side view of the integration device for a compact disk in accordance with the present invention.

With reference to FIGS. 1–3, the integration device for the compact disk comprises a reversing element (10), and an elevator (20).

The reversing element (10) is composed of a first engine (11), an arm (12) and a first seat (13). The first engine (11), which is composed of a servo motor (111) and a reduction gear (112), is provided on the first seat (13) in turn. In the preferred embodiment, the arm (12), which has an L-like cross section, is mounted with a power output axle of the reduction gear (112) in a first end and is integrally formed with a first suction disk (121), which can adhere to a base by a vacuum, in a second end. Hence, the arm (12) can pivot 180 degrees due to being driven by the first engine (11) so that the first suction disk (121) can rotate between a first position (A) and a second position (B) in turn.

The elevator (20), which is provided in the first position (A), is composed of a second seat (21), a base (22), a second suction disk (23) and a second engine (24). The base (22) is securely mounted on the second seat (21) and defined with a hole in a central and an axial direction thereof. A shank (231), which is securely mounted under the second suction disk (23), is inserted upright into the hole of the base (22). The second engine (24) is mounted under the second seat (21) and a power output axle thereof is connected to the shank (231) thereby lifting and rotating the second suction disk (23).

In usage, a first base (30A), and a second base (30B) with a record layer, are respectively taken to be provided on the rotating disk elements, and thereby being rotated relative to the glue element. The first and the second base (30A, 30B) are respectively pushed upwards beyond the rotating disk elements by two pushing heads so that the glue element respectively lays a ring of the glue on predetermined areas of the first and the second base (30A, 30B). Then, the first and the second base (30A, 30B) are respectively moved to the integration device for the compact disk in accordance with the present invention and therefore, the first and the second base (30A, 30B) can be attached to each other.

Figure 4:
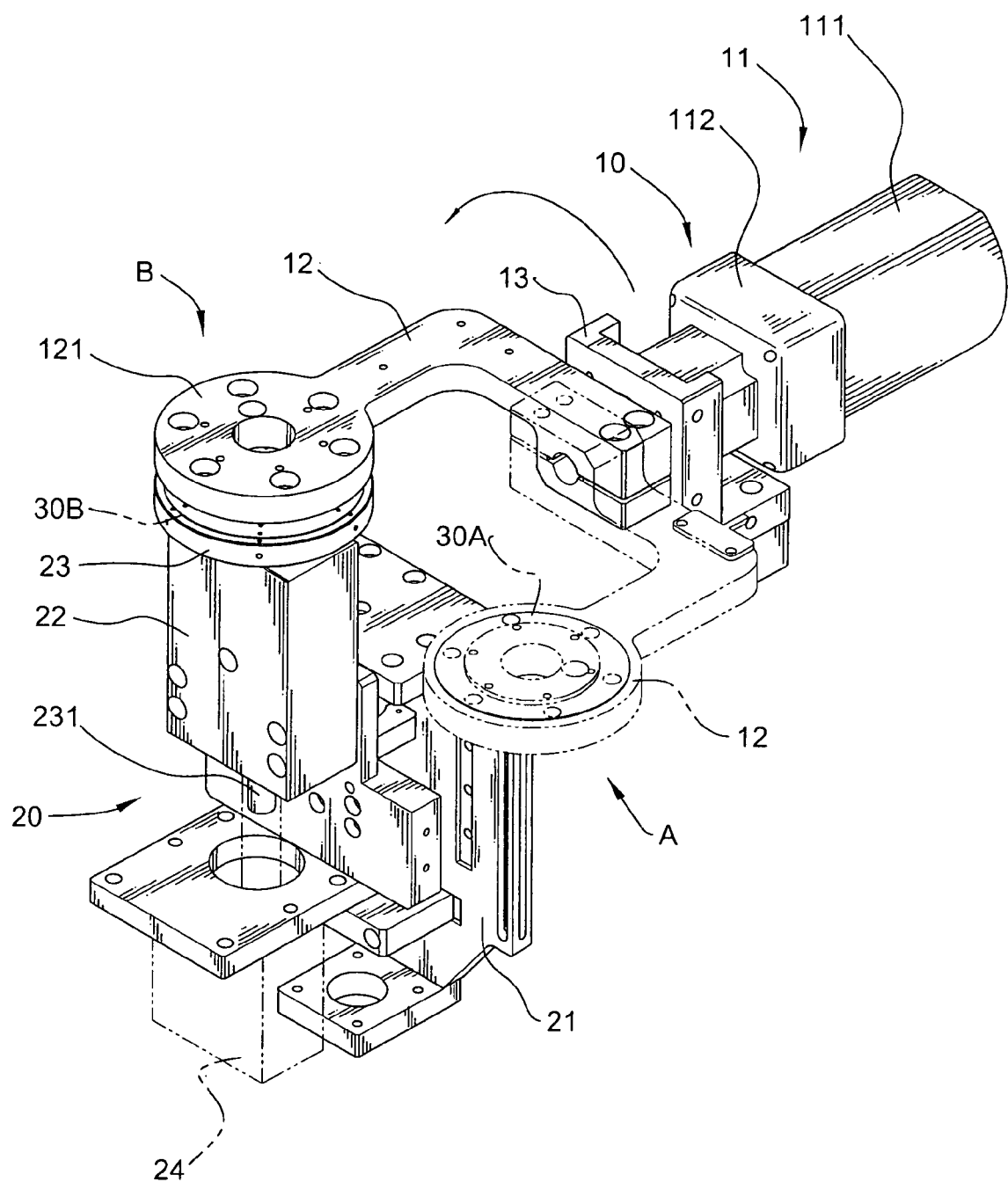
FIG. 4 is a perspective view of the integration device for a compact disk in accordance with the present invention in usage.
Figure 5:
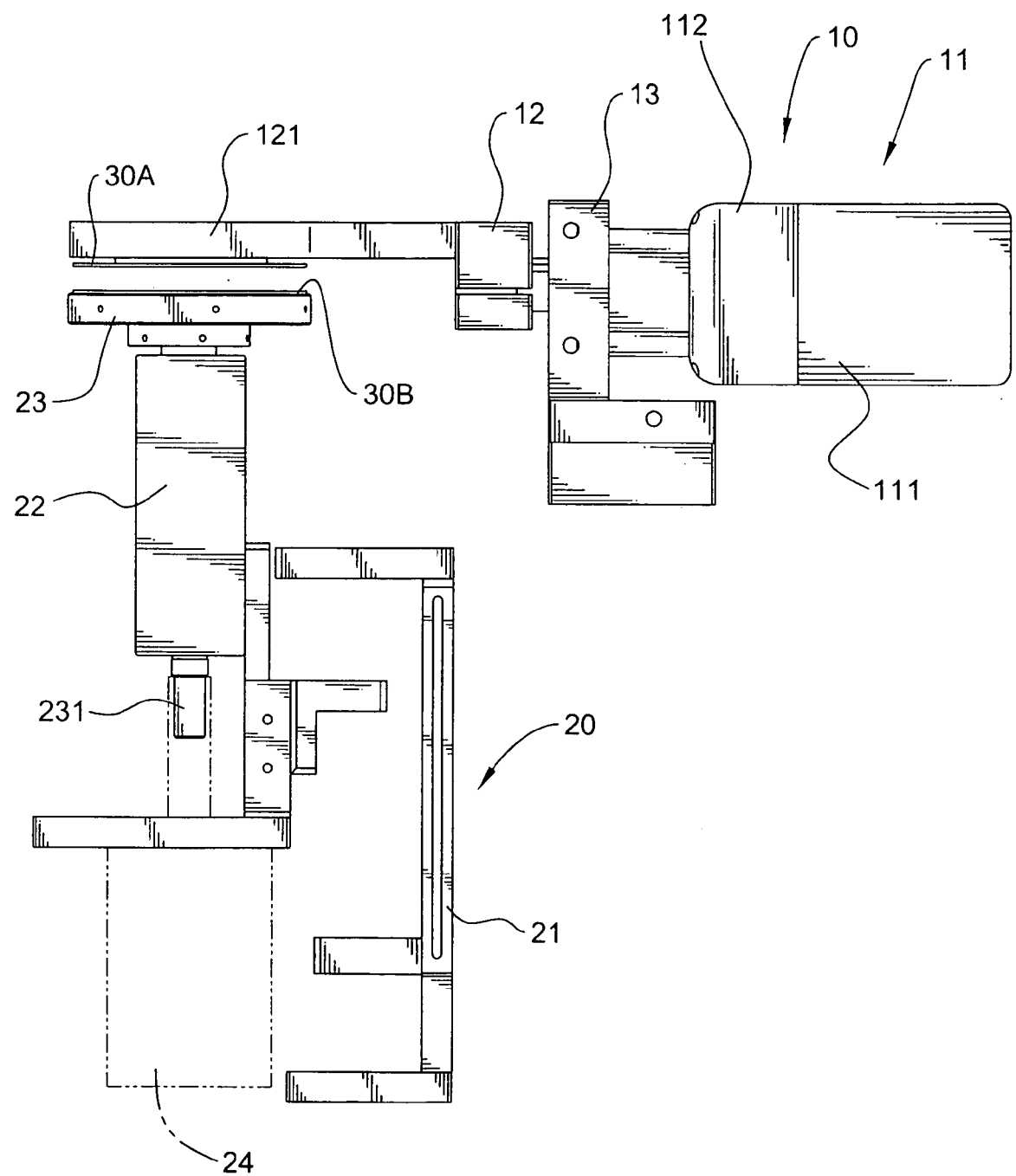
FIG. 5 is a first side view of the integration device for a compact disk in accordance with the present invention in usage.
Figure 6:
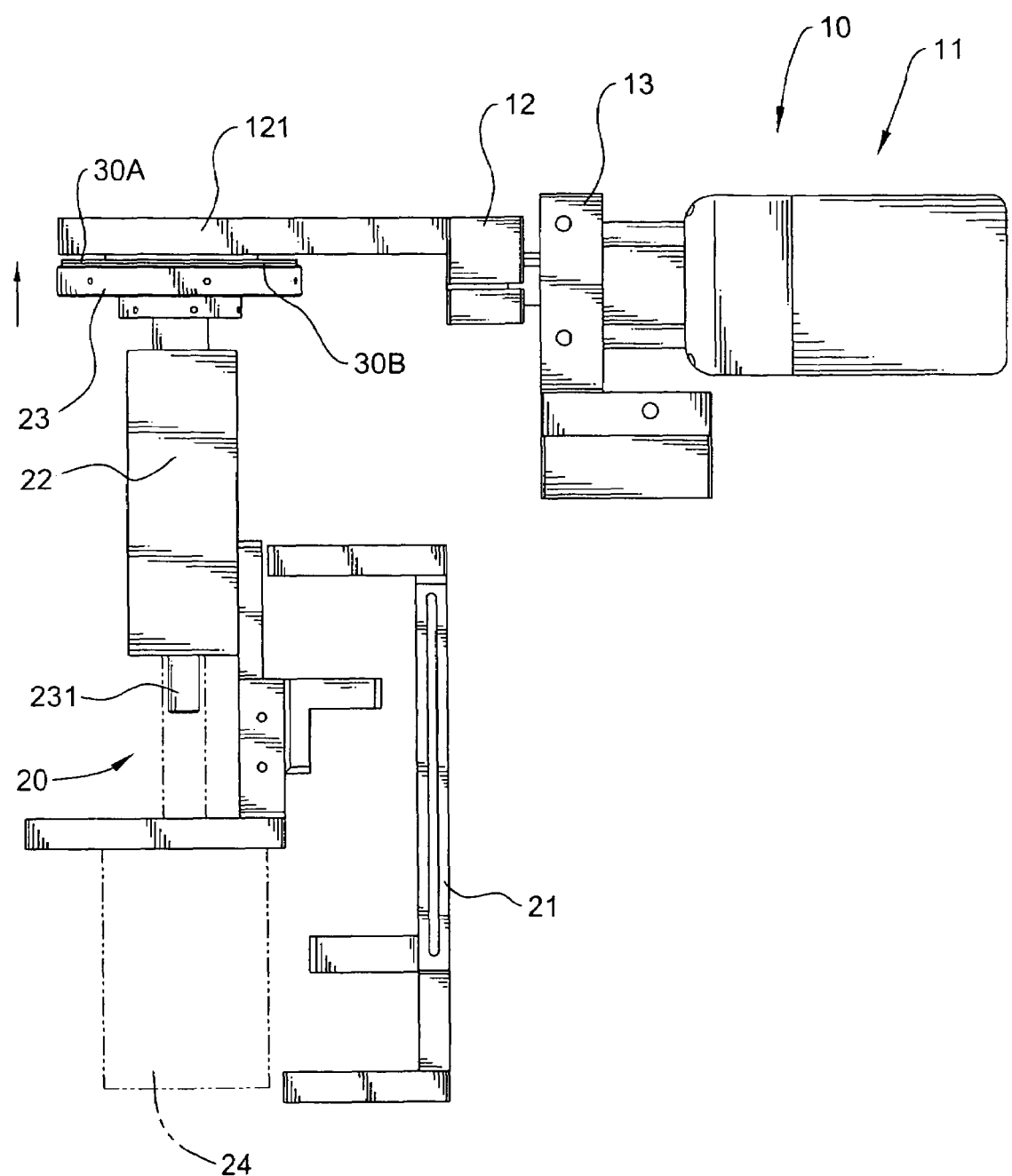
FIG. 6 is a second side view of the integration device for a compact disk in accordance with the present invention in usage.

With reference to FIGS. 4–6, the first suction disk (121) is provided under the rotating disk element in the position (A) and the second suction disk (23) is provided under the rotating disk element in the position (B). The first base (30A), which is attached by the first suction disk (121), rotates from the first position (A) to the second position (B) by the rotation of the first suction disk (121), and thereby faces the second base (30B). The first base (30A) moves with a side thereof being laid with the glue downwards while the second base (30B) moves with a side thereof being laid with the glue upwards, and therefore the first and the second base (30A, 30B) can combine to each other due to the glue. Then, the arm (12) is rotated to the first position of (A) and a compact disk which is composed of the two bases (30A, 30B) is autorotated due to the second suction disk (23) so that the glue can be evenly distributed between the first and the second base (30A, 30B).

Hence, the first base (30A) is raised facing the second base (30B) so that the first base (30A) can be directly adjacent to the second base (30B) thereby avoiding generating the bubbles to enable the glue to distribute evenly and result in the compact disk with an even thickness.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An integration device for evenly distributing glue in a compact disk which has two bases comprising:

a reversing element (10) having a first engine (11), an arm (12) and a first seat (13), the first engine (11) securely mounted on the first seat (13), a first end of the arm (12) connected to a power output axle of the first engine (11), a second end of the arm (12) integrally formed with a first suction disk (121), whereby the arm (12) alternates from an original state to a changed state so that the first suction disk (121) can be moved from a first position (A) to a second position (B); and an elevator (20) provided in the position (B) and having a second seat (21), a base (22), a second suction disk (23) and a second engine (24), the base (22) mounted on the second seat (21) and defined with a hole, a shaft (231) mounted in a center of the second suction disk (23) and upright inserted into the hole, and the second engine (24) mounted under the second seat (21) and a power output axle thereof connected to the shaft (231), whereby the second suction disk (23) is driven to rotate or lift, and the two bases, which are respectively provided on the first and the second suction disk (121, 23), can be adjacent to each other face to face whereby the glue can be evenly and distributed in a bubble-free manner between the bases.

2. The integration device for the compact disk as claimed in claim 1, wherein the first engine (11) is composed of a servo motor (111) and a reduction gear (112).

3. The integration device for the compact disk as claimed in claim 1, wherein the arm (12) has an L-like cross section.

* * * * *